(12) United States Patent
Stanzel et al.

(10) Patent No.: US 7,411,147 B2
(45) Date of Patent: Aug. 12, 2008

(54) GAS BOTTLE FOR WELDING-TYPE DEVICES

(75) Inventors: Kenneth A. Stanzel, Appleton, WI (US); Ronald Woodward, Kaukauna, WI (US); John Breitbach, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 458 days.

(21) Appl. No.: 10/709,540

(22) Filed: May 12, 2004

(65) Prior Publication Data

US 2005/0252889 A1 Nov. 17, 2005

(51) Int. Cl.
B23K 9/16 (2006.01)
(52) U.S. Cl. ..................... 219/74; 219/130.1
(58) Field of Classification Search .............. 219/130.1, 219/136, 74, 75
See application file for complete search history.

(56) References Cited

U.S. PATENT DOCUMENTS

| | | | |
|---|---|---|---|
| 2,510,205 A | 6/1950 | Baird | |
| 3,309,497 A | 3/1967 | Kensrue | |
| 4,702,277 A | 10/1987 | Ollivier | |
| 4,782,204 A * | 11/1988 | Gartland | ...................... 219/74 |
| 5,472,024 A | 12/1995 | Brugerolle et al. | |
| 5,507,531 A | 4/1996 | Aldridge | |
| 5,698,116 A | 12/1997 | Löbel et al. | |
| 5,791,328 A | 8/1998 | Alexander | |
| 5,904,133 A | 5/1999 | Alexander et al. | |
| 5,950,611 A | 9/1999 | Lopez et al. | |
| 6,213,111 B1 | 4/2001 | Alexander et al. | |
| 6,227,187 B1 | 5/2001 | Alexander et al. | |
| 6,343,599 B1 | 2/2002 | Perrone | |
| 6,405,722 B2 | 6/2002 | Colby | |
| 6,474,325 B2 | 11/2002 | Rice | |
| 6,479,795 B1 | 11/2002 | Albrecht et al. | |
| 6,543,475 B2 | 4/2003 | Colby | |
| 6,590,184 B1 * | 7/2003 | Andersen | ..................... 219/136 |
| 6,644,295 B2 | 11/2003 | Jones | |
| 6,675,791 B1 | 1/2004 | Alexander et al. | |
| 6,977,358 B2 * | 12/2005 | Albrecht et al. | ........... 219/130.1 |

FOREIGN PATENT DOCUMENTS

| | | |
|---|---|---|
| DE | 83 08 999.3 U | 11/1983 |
| DE | 83 08 999.3 U | 11/1983 |
| EP | 1 493 525 A1 | 1/2005 |
| JP | 60-64769 A | 4/1985 |
| JP | S60-64769 | 4/1985 |

* cited by examiner

Primary Examiner—Kevin P Kerns
(74) Attorney, Agent, or Firm—Ziolkowski Patent Solutions Group, SC (57) ABSTRACT

A gas bottle for welding-type devices, a shielding gas system, and a method for providing shielding gas to a weld are disclosed. The gas bottle has a valve constructed to be connected to a welding-type device and is preferably formed to fit within a cavity of a welding-type device. The gas bottle is constructed to provide shielding gas to the welding-type device immediately upon connection of the gas bottle to the welding-type device thereby eliminating a manual valve.

18 Claims, 5 Drawing Sheets

GAS BOTTLE FOR WELDING-TYPE DEVICES

BACKGROUND OF INVENTION

The present invention relates generally to welding systems and, more particularly, to a gas cylinder for providing shielding gas to a weld.

Welder power sources have become increasingly portable in recent years. This portability is largely the result of lighter unit weight and improved electrical components. One advancement in the area of electrical components has been the incorporation of inverter-type power sources. The application of an inverter power source has reduced the size and weight of welders and created usable space within the confines of the housing, while maintaining the ability to generate the outputs required for welding.

Improvements in wire feeder technology have also improved the ease of use and portability of a welder. Wire welding is generally believed to be easier to learn than conventional stick welding and as such, relatively inexperienced artisans can produce adequate results in relatively little time. As a result, due to the ease of use and versatility of application, many users prefer wire welding over conventional stick welding.

Space in any work environment is always at a premium. Whether the welder is used in the hobbyist's garage or the machine shop of an industrial plant, the size of the unit is always a design consideration. The space used by a welder is not limited to the dimensions of the power source itself but includes the ancillaries related to welding processes such as cables, consumables, and gas cylinders. The space required for the storage and maintenance of these items is another consideration associated with many welders.

Shielding gas cylinders provide gas to the welding process. This gas essentially encapsulates the welding process in order to protect the integrity of the weld from contaminants and also enhances arc performance during a welding process. The shielding gas is generally provided in very large and very heavy cylinders. The cylinders are constructed ruggedly to withstand the high pressure of the gas contained therein and the rigors of the workplace. A regulator and valve assembly are typically attached to the gas cylinder and allow the operator of the welding power source to control the amount of gas supplied to the welding process.

The size and weight of the gas cylinders significantly detracts from the portability of the welder. Additionally, attempts to move the welder and gas cylinder together presents an opportunity for inadvertent damage to the gas cylinder or to the regulator attached thereto unless a cart is provided. Such carts however are large and typically constructed to accommodate bulky gas cylinders. As such, the portability of the welding apparatus is limited by the portability of the shielding gas cylinder.

It would therefore be desirable to design a system and method of providing a shielding gas container that is lightweight and highly portable.

BRIEF DESCRIPTION OF INVENTION

The present invention is directed to a shielding gas cylinder that solves the aforementioned drawbacks.

Therefore in accordance with one aspect of the present invention, a gas cylinder assembly for use in a welding-type device is disclosed that has a gas cylinder configured to be enclosed in a welding-type device. The gas cylinder has a neck portion, a base portion, and a body portion enclosing a cavity and constructed to receive a gas therein. A valve is disposed about the neck portion and operatively separates the cavity from atmosphere. The valve is operably engageable by a regulator constructed to allow flow of the gas therethrough.

According to another aspect of the present invention, an adapter for a shielding gas system of a welding-type device is disclosed. The adapter has a passage extending through a body and fluidly connects a first end and a second end. The first end is constructed to be connected to a gas cylinder and the second end is constructed to be connected to a regulator with the body extending between the first and second ends. A nipple extends from the body into a recess formed in the first end and is constructed to operatively engage a valve of the gas cylinder.

In accordance with a further aspect of the present invention, a shielding gas system for a welding-type device is disclosed. The system has a valve connected to a gas cylinder and biased to a closed position and a coupler constructed to bias the valve open when the coupler is connected to the gas cylinder.

In accordance with another aspect of the present invention, a shielding gas system for a welding device is disclosed that includes a gas bottle having a first end having an opening and a second closed end. A body extends from the first end to the second closed end and a valve is disposed in the opening of the first end. The shielding gas system includes an adapter constructed to automatically open the valve when connected about the first end of the gas bottle.

According to a further aspect of the present invention, a welding device is disclosed that has a housing enclosing a power source constructed to supply a welding power. A gas cylinder is attached to the housing and constructed to provide a shielding gas. The gas cylinder has a length that is less than a length of a side of the housing.

According to yet another aspect of the present invention, a method of providing shielding gas to a weld is disclosed that includes initiating a welding arc and opening a shielding gas path to a gas system and providing the gas immediately upon connection of a gas source to a welding-type device.

In accordance with a further aspect of the present invention, a welding-type device is disclosed that has means for generating a welding power and means for providing shielding gas to a weld. A means for fluidly connecting the means for providing shielding gas is included that communicates shielding gas to the means for generating welding power upon a connection of the means for providing shielding gas to the means for generating welding power.

Therefore, the present invention provides a shielding gas cylinder that is lightweight and easily transportable. Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

As one skilled in the art will fully appreciate, the hereinafter description of welding devices not only includes welders but also includes any system that requires high power outputs that can benefit from the use of a compressed shielding gas. Such systems can include heating and cutting systems. Description of a welding-type apparatus illustrates just one embodiment in which the present invention may be implemented.

Figure 1:
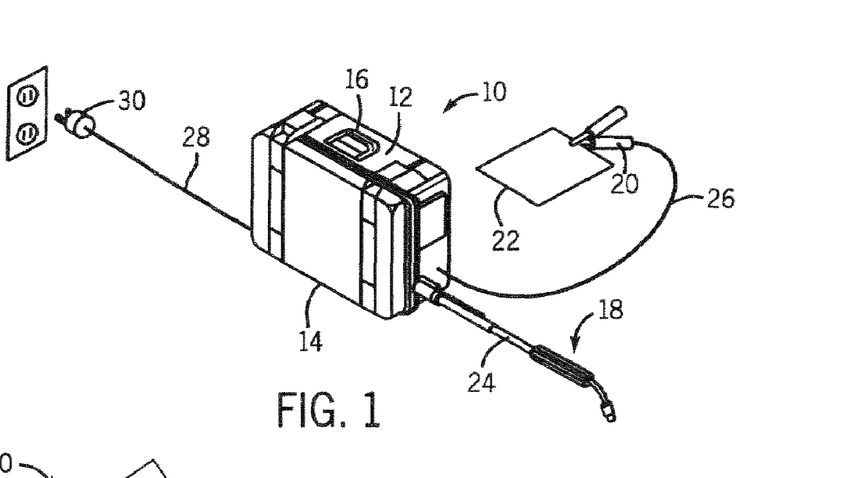
FIG. 1 is a perspective view of an exemplary power source incorporating the present invention.

Referring to FIG. 1, a perspective view of a welding device incorporating the present invention is shown. Welding device 10 includes a housing 12 enclosing the internal components of the welding device under a cover 14. The welding device 10 includes a handle 16 for transporting the welding system from one location to another. Although shown as a "suitcase" welding device, capable of being easily transported by one person, the present invention is equally applicable to larger welding devices which may have more limited portability. To effectuate the welding process, such as TIG or MIG welding, the welding device includes a torch 18 as well as a work clamp 20. The work clamp 20 is configured to complete an electrical circuit from torch 18 through workpiece 22. As is known, when the torch 18 is in relative proximity to workpiece 22, a welding arc or cutting arc results, depending upon the particular welding desired. A pair of cables 24 and 26 connects the torch 18 and work clamp 20 to the housing 12, respectively. A power cable 28 extends from welding device 10 and is connectable to a variety of inputs. As shown, power cable 28 includes a plug 30 constructed to engage an electrical outlet and supply power to welding device 10 from a power grid. It is understood power cable 28 can be configured to communicate power to welding device 10 from any type of power source, including an engine driven generator, a power grid, a battery, etc.

Figure 2:
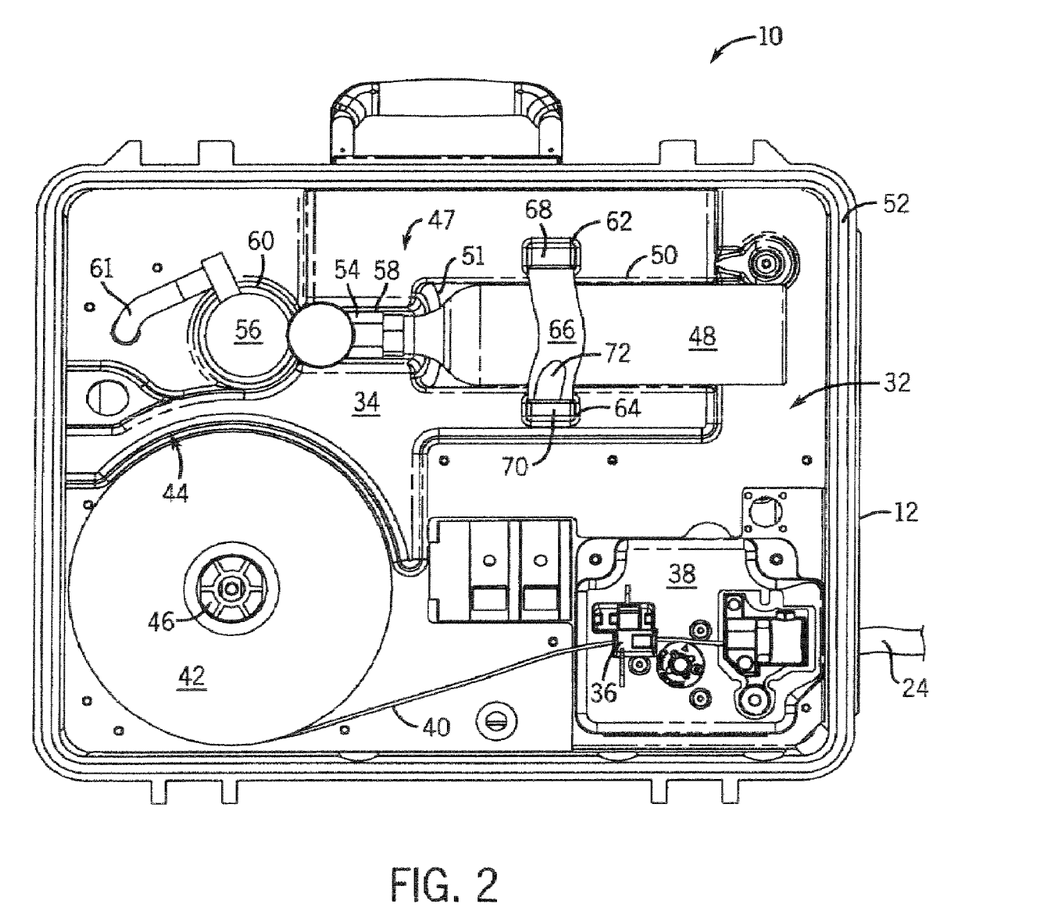
FIG. 2 is a side elevational view of the power source of FIG. 1 with a cover removed.

FIG. 2 shows welding device 10 with cover 14 removed therefrom. Having cover 14 removed exposes an internal cavity 32 of welding device 10. A shroud 34 separates a majority of internal cavity 32 so that removing cover 14 does not expose a majority of the electronic components of the welding device. A wire guide 36 and a wire feed 38 are positioned proximate the connection of cable 24 in housing 12. A guide wire 40 is drawn from a spool 42 by wire feed 38 to the torch through cable 24. Shroud 34 has a curved portion 44 to accommodate the positioning of spool 42 on a hub 46 of welding device 10. A shielding gas system 47 includes a gas cylinder 48 constructed to snuggly engage a first portion 50 of a recess 51 formed in shroud 34. Although gas cylinder 48 is shown in a generally horizontal orientation relative to welding device 10, such an orientation is merely exemplary. It is understood that gas cylinder 48 could be positioned in any orientation and could be located entirely within a perimeter 52 of housing 12 as shown, partially within housing 12, or external to the housing, if desired.

Shielding gas system 47 includes an adapter 54 and a regulator 56. Adapter 54 is fluidly connected between gas cylinder 48 and regulator 56 of shielding gas system 47. Adapter 54 engages gas cylinder 48 and allows shielding gas to flow from gas cylinder 48 to regulator 56 immediately upon connection thereto, as will later be described in more detail with reference to FIGS. 47 and 9. Adapter 54 is constructed to be snuggly positioned in a second portion 58 of recess 51. Regulator 56 is positioned in a third portion 60 of recess 51 and is fluidly connected to the torch of welding device 10 via a hose 61 and controls the amount of shielding gas provided to the torch during a welding operation. Optionally, during operation of a welding process, a valve (not shown) is fluidly connected between torch 18 and regulator 56 such that the flow of shielding gas from shielding gas system 47 to torch 18 is only allowed when an operator has depressed a trigger or other actuator of torch 18.

Shroud 34 has a first boss 62 and a second boss 64 which generally flank gas cylinder 48. A strap 66 has a first end 68 pivotally connected to first boss 62 and a second end 70 constructed to engage second boss 64 of shroud 34. A latch 72 is pivotally connected to second end 70 of strap 66 and is constructed to removably engage second boss 64 of shroud 64. Strap 66 spans gas cylinder 48 and secures the gas cylinder in recess 51. Latch 72 allows an operator to quickly remove and replace gas cylinder 48 from welding device 10.

Figure 3:
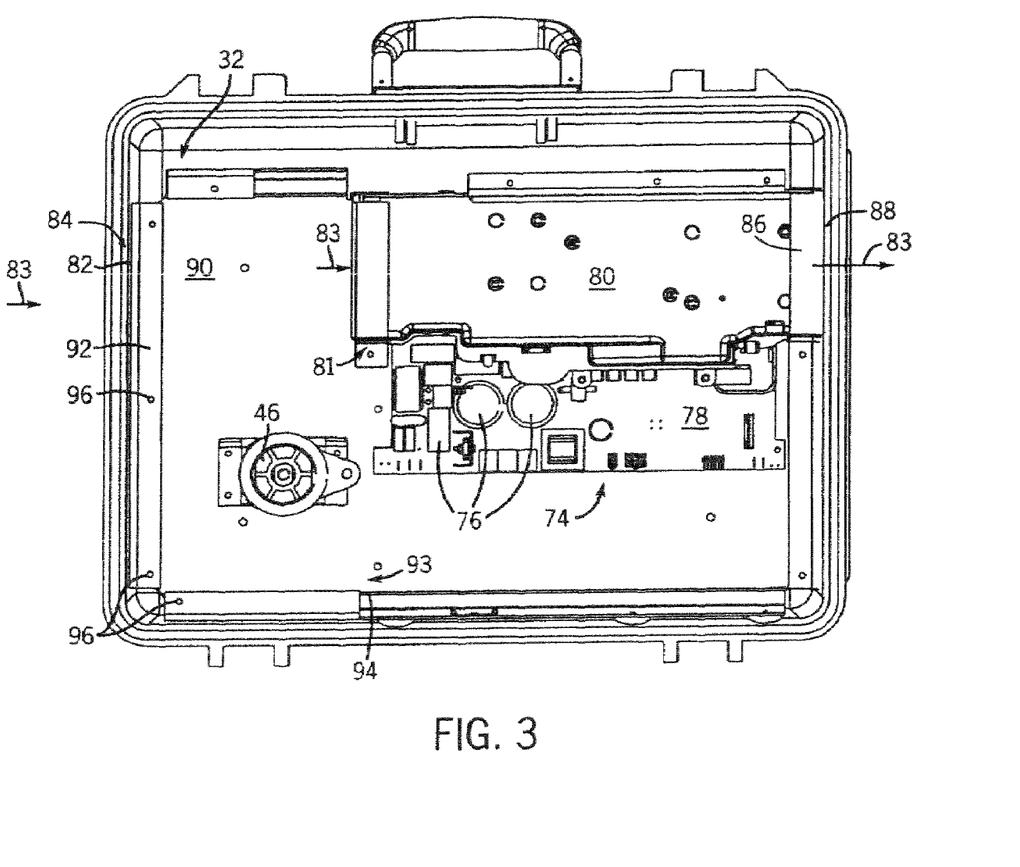
FIG. 3 is a side elevational view of the power source of FIG. 2 with a shroud and a shielding gas system removed.

Referring to FIG. 3, removing shroud 34 from internal cavity 32 of welding device 10 exposes a power supply 74 of welding device 10. Power supply 74 includes a plurality of electrical components 76 attached to a circuit board 78. A wind tunnel 80 is attached about a portion 81 of circuit board 78. Wind tunnel 80 has a plurality of heat generating components (not shown) positioned thereabout. These heat generating components can include transformers, inductors, and core windings necessary to generate a power signal suitable for welding applications. Those components mounted within wind tunnel 80 are cooled by direct exposure to a flow of cooling air, indicated by arrow 83, through housing 12 of welding device 10. A fan (not shown) can also be located in the wind tunnel to facilitate moving sufficient amounts of cooling air through the welding device 10. A screen 82 is located over an inlet opening 84 formed in housing 12 and prevents particulates associated with a work environment from entering the housing of welding device 10. In addition to the heat generating components positioned within wind tunnel 80, or alternatively thereto, wind tunnel 80 is also constructed to accommodate heat sinks (not shown) therein. The heat sinks are thermally connectable to the electrical components 76 that are preferably positioned outside of wind tunnel 80. Such a construction maximizes cooling of all of the heat generating electrical components of power supply 74 while reducing the exposure of electrical components 76 to any particulates that may be carried on the cooling flow 83 through housing 12 of welding device 10.

Prior to entering wind tunnel 80, cooling flow 83 passes through internal cavity 32 of welding device 10 and cools electrical components 76 of welding device 10. Air that enters welding device 10 passes through wind tunnel 80, exits wind tunnel 80 at an outlet end 86, and exits the welding device through an exhaust vent 88 formed in housing 12. A mounting bracket 90 is positioned in internal cavity 32 and secures wind tunnel 80 and power supply 74 to housing 12. Hub 46 extends from mounting bracket 90 and is constructed to receive wire spool 42 shown in FIG. 2. Returning to FIG. 3, a flange 92 extends about a portion 93 of perimeter 94 of mounting bracket 90 and has a plurality of holes 96 formed therein. Holes 96 are positioned to receive corresponding bosses (not shown) that extend from shroud 34 and secure shroud 34, as shown in FIG. 2, to welding device 10. Alternatively, it is understood that shroud 34 could be attached to flange 92 with a plurality of threaded fasteners.

Figures 4, 9:
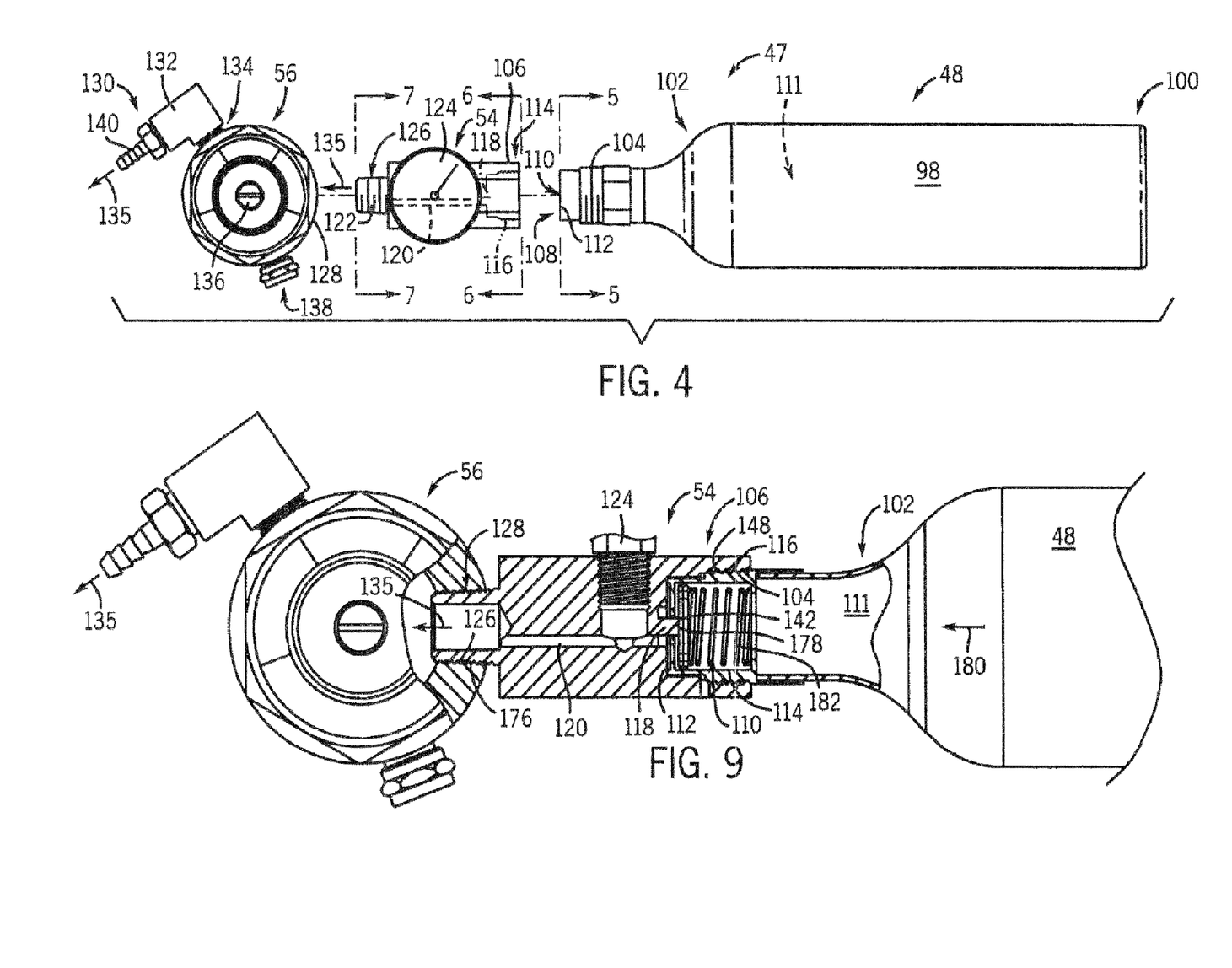
FIG. 4 is an exploded plan view of the shielding gas system of FIG. 2.
FIG. 9 is a side plan view of the shielding gas system of FIG. 2 in partial section.

Referring to FIG. 4, the main components of shielding gas system 47 are shown separated from one another. Gas cylinder 48 has a body 98 which extends between a base portion 100 and a neck portion 102. Neck portion 102 has a threaded section 104 constructed to engage a first end 106 of adapter 54. Neck portion 102 of gas cylinder 48 has an opening 108 formed through neck portion 102. A valve 110 is positioned in opening 108 and operatively separates an internal cavity 111 of gas cylinder 48 from atmosphere. Valve 110 is biased to a closed position when gas cylinder 48 is separated from adapter 54 and prevents communication between internal cavity 111 of gas cylinder 48 and atmosphere. Valve 110 does not extend beyond an end face 112 of gas cylinder 48. Such a construction prevents the inadvertent venting of internal cavity 111 when gas cylinder 48 is not connected to adapter 54. Valve 110 is constructed integrally with gas cylinder body 98 and neck portion 102 to form a one-piece valve and gas cylinder 48.

Adapter 54 has a recess 114 (shown in phantom) formed in first end 106. A periphery 116 of recess 114 is threaded to engage threaded section 104 of gas cylinder 48. A nipple 118 extends into recess 114 of first end 106 of adapter 54 and is constructed to engage valve 110 of gas cylinder 48 upon connection of the gas cylinder to adapter 54. Such a construction allows the automatic actuation of valve 110 upon the connection of gas cylinder 48 to adapter 54 and results in the immediate communication of gas between internal cavity 111 and regulator 56. That is, by biasing valve 110 to an open position, nipple 118 allows passage of gas from internal cavity 111 of gas cylinder 48 into a passage 120 formed in adapter 54. In this manner, a manually operated valve is eliminated. Passage 120 fluidly connects first end 106 of adapter 54 with a second end 122 of adapter 54. A pressure gauge 124 is in fluid communication with passage 120 and indicates the pressure of shielding gas contained therein. Second end 122 of adapter 54 has a threaded portion 126 constructed to engage regulator 56. Although threaded portion 126 of second end 122 is shown in a male configuration and the threading of periphery 116 of recess 114 is shown in a generally female configuration, it is understood that these connections are merely exemplary and could vary depending on the connection configuration of the components being connected thereto.

Regulator 56 has an opening 128 formed therein and constructed to engage threaded portion 126 of second end 122 of adapter 54. An outlet 130 having an elbow portion 132 is connected to a second opening 134 formed in regulator 56. A gas passage, indicated by arrows 135, extends between opening 128 and outlet 130 and is interrupted by an adjusting screw 136. Manipulation of adjusting screw 136 regulates the flow of shielding gas through regulator 56 to outlet 130 and controls the amount of shielding gas provided to a welding-type device connected thereto. A relief valve assembly 138 is also fluidly connected to gas passage 135 of regulator 56 and allows for the controlled release of gas contained therein in the event that a pressure of gas in gas passage 135 exceeds a maximum operating pressure. Outlet 130 includes a rib portion 140 constructed to receive hose 61, shown in FIG. 2, thereabout. The gas hose connects regulator 56 to a welding-type device and fluidly communicates shielding gas to a torch.

Figure 5:
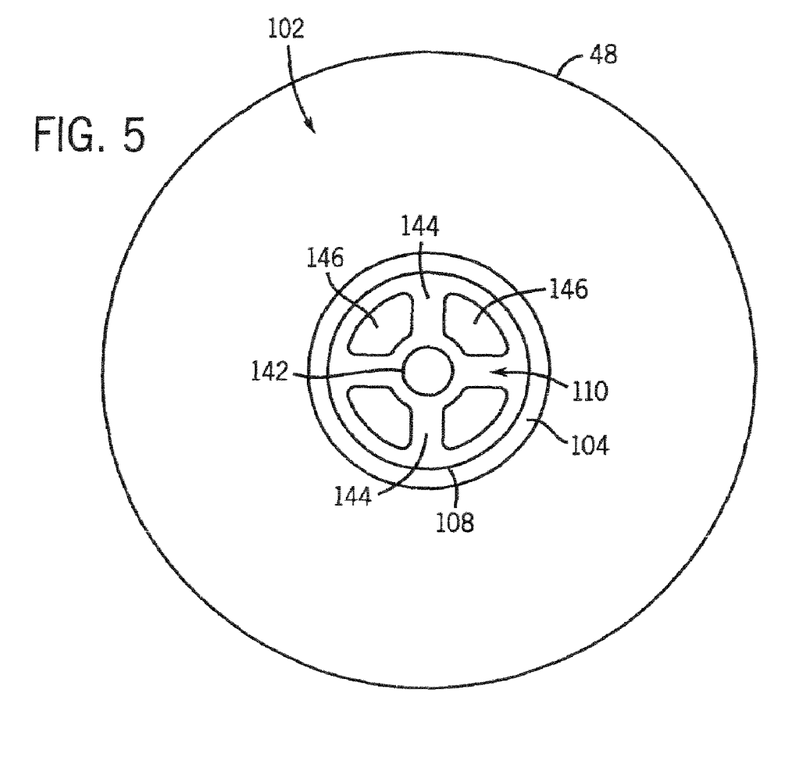
FIG. 5 is an end view of the gas cylinder taken along line 5-5 of FIG. 4.

FIG. 5 shows an end view of neck portion 102 of gas cylinder 48. Valve 110 is disposed in opening 108 of gas cylinder 48 and includes an actuator 142 generally centrally positioned therein. A plurality of ribs 144 are separated by a plurality of passages 146 and support actuator 142 in valve 110. Although biased closed, applying pressure to actuator 142 opens valve 110 and allows passage of shielding gas from within gas cylinder 48 through passages 146 and out of the gas cylinder. Threaded section 104 extends about valve 110 and has an axis of engagement generally coaxial with the axis of operation of actuator 142.

Figure 6:
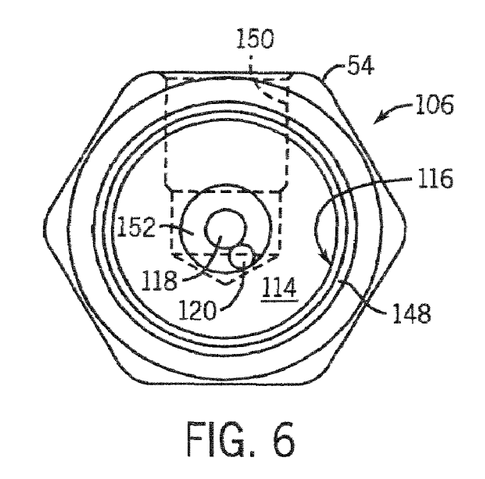
FIG. 6 is an end view of the adapter taken along line 6-6 of FIG. 4.
Figure 7:
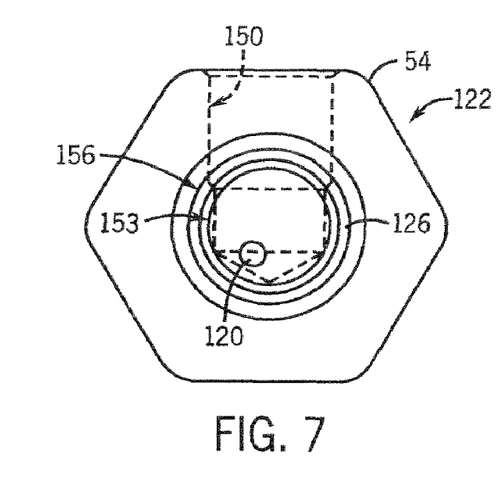
FIG. 7 is an end view of the adapter taken along line 7-7 of FIG. 4.

FIG. 6 shows an end view of first end 106 of adapter 54. A plurality of threads 148 extends about periphery 116 of recess 114. Nipple 118 extends into recess 114 and is generally concentric with threads 148. Passage 120 is offset from nipple 118 and passes through adapter 54 to second end 122 of adapter 54 as shown in FIG. 7. Returning to FIG. 6, a threaded opening 150 extends into adapter 54 and is in fluid communication with passage 120. Threaded opening 150 is constructed to receive a pressure gauge therein. Such a construction allows pressure gauge 124, shown in FIG. 4, to indicate the shielding gas pressure within passage 120. An annular groove 152 is formed about nipple 118 and provides for unobstructed passage of shielding gas from gas cylinder 48 to passage 120 upon connection of the gas cylinder to adapter 54. Upon connecting gas cylinder 48 to adapter 54, nipple 118 engages actuator 142 of valve 110 and immediately, automatically opens valve 110.

Referring to FIG. 7, a recess 153 is formed in second end 122 of adapter 54. Threaded portion 126 extends about a perimeter 156 of second end 122 and is constructed to threadingly engage regulator 56. Passage 120 fluidly communicates shielding gas to recess 154 which fluidly communicates shielding gas to regulator 56.

Figure 8:
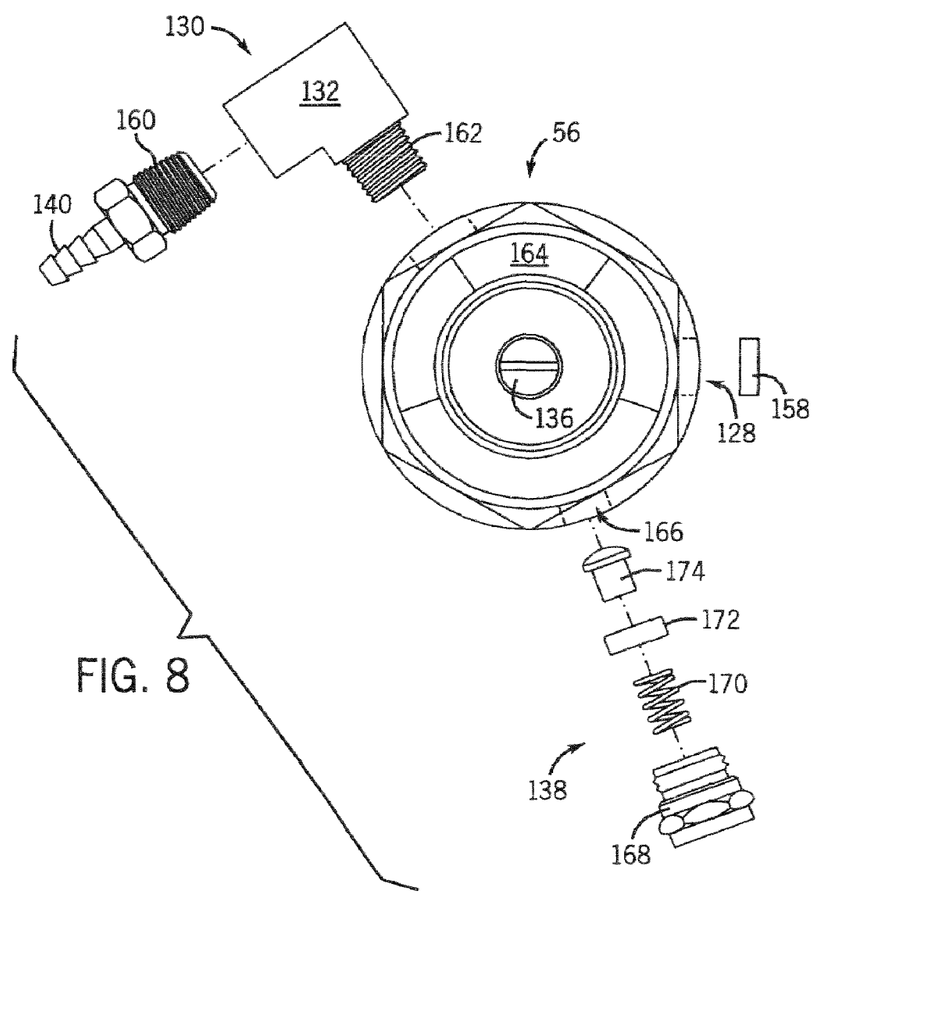
FIG. 8 is an exploded plan view of the regulator of the shielding gas system of FIG. 4.

Regulator 56 is shown in greater detail in FIG. 8. Opening 128 is constructed to receive a filter element 158 therein. Filter element 158 prevents the penetration of particulates that may be carried on the shielding gas flow through adapter 54 from passing into regulator 56. Outlet 130 has a threaded portion 160 opposite ribbed portion 140 constructed to threadingly engage elbow portion 132 of outlet 130. Elbow portion 132 includes a threaded portion 162 constructed to threadingly engage regulator 56. Adjusting screw 136 is rotatably connected to a body 164 of regulator 56 and allows operator control over an amount of shielding gas allowed to flow through regulator 56. A relief valve opening 166 is formed in regulator 56 and is constructed to receive a relief valve assembly 138 therein. A spring 170 biases a seat retainer 172 against a seat 174. A relief valve body 168 secures spring 170, seat retainer 172, and seat 174 within relief valve opening 166 of regulator 56. Relief valve assembly 138 allows for the pressure relief of shielding gas contained in regulator 56.

As shown in FIG. 9, an inner periphery 176 of opening 128 of regulator 56 threadingly engages threaded portion 126 of adapter 54 and fluidly communicates shielding gas to flow passage 135 of regulator 56 from passage 120 of adapter 54. Pressure gauge 124 is also fluidly connected to passage 120 of adapter 54 and indicates the gas pressure therein. Threading 148 of periphery 116 of recess 114 of first end 106 of adapter 54 is threadingly connected to threaded section 104 of gas cylinder 48. When fully connected, end face 112 of neck portion 102 of gas cylinder 48 extends past an end 178 of nipple 118. End 178 of nipple 118 engages actuator 142 of valve 110 of gas cylinder 48 and fluidly connects cavity 111 of gas cylinder 48 with passage 120 of adapter 54. As gas cylinder 48 is threaded into recess 114 of adapter 54, nipple 118 displaces actuator 142 of valve 110 in a direction generally opposite the direction of engagement, indicated by arrow 180, of threaded section 104 of gas cylinder 48 and recess 114 of adapter 54 thereby opening valve 110. A spring 182 biases valve 110 to a closed position when actuator 142 is not biased by nipple 118 of adapter 54. Upon connection of gas cylinder 48 to adapter 54, shielding gas contained within internal cavity 111 of gas cylinder 48 is allowed to flow through passage 120 of adapter 54 and into regulator 56. Such a connection automatically opens valve 110 of gas cylinder 48 upon connection of the gas cylinder to adapter 54 without requiring the manipulation of an additional valve.

Therefore, the present invention includes a gas cylinder assembly for use in a welding-type device that has a gas cylinder configured to be enclosed in a welding-type device. The gas cylinder has a neck portion, a base portion and a body portion enclosing a cavity and constructed to receive a gas therein. A valve is disposed about the neck portion and operatively separates the cavity from atmosphere. The valve is operably engageable by a regulator constructed to allow flow of the gas therethrough.

In another embodiment of the present invention, an adapter for a shielding gas system of a welding-type device has a passage extending through a body and fluidly connects a first end and a second end. The first end is constructed to be connected to a gas cylinder and the second end is constructed to be connected to a regulator with the body extending between the first and second ends. A nipple extends from the body into a recess formed in the first end and is constructed to operatively engage a valve of the gas cylinder.

An alternate embodiment of the present invention has a shielding gas system for a welding-type device. The shielding gas system has a valve connected to a gas cylinder and biased to a closed position. A coupler is constructed to bias the valve open when the coupler is connected to the gas cylinder.

Another embodiment of the present invention includes a shielding gas system for a welding device having a gas bottle with a first end having an opening and a second closed end. A body extends from the first end to the second closed end and a valve is disposed in the opening of the first end. The shielding gas system includes an adapter constructed to automatically open the valve when connected about the first end.

A further embodiment of the present invention has a welding device having a housing enclosing a power source constructed to supply a welding power. A gas cylinder is attached to the housing and constructed to provide a shielding gas. The gas cylinder has a length that is less than a length of a side of the housing.

Another embodiment of the present invention includes a method of providing shielding gas to a weld includes initiating a welding arc and opening a shielding gas path to a gas system and providing shielding gas immediately upon connection of a gas source to a welding-type device.

An additional embodiment of the present invention includes a welding-type device having means for generating a welding power and means for providing shielding gas to a weld. A means for fluidly connecting the means for providing shielding gas is included that communicates shielding gas to the means for generating welding power upon connection of the means for providing shielding gas to the means for generating welding power.

The present invention has been described in terms of the preferred embodiment, and it is recognized that equivalents, alternatives, and modifications, aside from those expressly stated, are possible and within the scope of the appending claims.

The invention claimed is:

1. A welding device comprising:
   a suitcase housing having a shape to compactly enclose a power source constructed to supply a welding power, the suitcase housing including a pair of connected side shells having equal outer perimeters and being hinged together to enclose the power source;
   an adapter fluidly connected to a torch of the welding device without a manually adjusted valve therebetween;
   a gas cylinder attached to the housing and constructed to provide a shielding gas, the gas cylinder having a length that is less than a length of a side of the housing; and
   wherein the gas cylinder is automatically fluidly connected to the torch by translating the gas cylinder along a longitudinal axis of the gas cylinder and into contact with the adapter.

2. The welding device of claim 1 further comprising a regulator attached to the gas cylinder and operable through an opening in the housing.

3. The welding device of claim 1 wherein the gas cylinder is disposable.

4. The welding device of claim 1 wherein the gas cylinder is refillable.

5. The welding device of claim 1 further comprising a shroud positioned in the housing and having a recess constructed to receive the gas cylinder therein.

6. The welding device of claim 5 further comprising a strap constructed to straddle the gas cylinder having a first end pivotably connected to the shroud and a second end removably connectable to the shroud.

7. The welding device of claim 5 wherein the shroud further comprises a second recess connected to the first recess and constructed to snuggly receive the adapter therein.

8. The welding device of claim 7 wherein the adapter has a threaded recess constructed to engage the gas cylinder and a nipple disposed within the recess.

9. The welding device of claim 8 wherein the nipple operably engages a valve integral to the gas cylinder as the gas cylinder is moved relative to the adapter.

10. The welding device of claim 7 further comprising a third recess connected to the second recess opposite the first recess and constructed to snuggly receive a regulator therein.

11. A method of providing shielding gas to a weld comprising:
   initiating a welding arc; and
   opening a shielding gas path to a gas system and providing shielding gas immediately upon connection of a gas source to a welding-type device;
   wherein opening the shielding gas path includes:
      positioning an adapter having a threaded recess therein adjacent to a threaded section on the gas source;
      rotating the gas source to engage the threaded section of the gas source with the threaded recess; and
      wherein the engaging of the threaded section with the threaded recess causes a nipple positioned on the adapter to actuate a valve positioned on the gas source and provide a flow of the shielding gas.

12. The method of claim 11 further comprising closing the gas source by separating the gas source and the welding-type device.

13. A welding-type device comprising:
   means for generating a welding power;
   means for providing shielding gas to a weld;
   means for fluidly connecting the means for providing shielding gas and the means for generating welding power upon connection of the means for providing shielding gas and the means for generating welding power; and
   a suitcase enclosure to compactly enclose the means for generating a welding power and the means for providing shielding gas, the suitcase enclosure including a pair of connected side shells having equal outer perimeters and being hinged together.

14. The welding-type device of claim 13 further comprising enclosing the means for generating a welding power and the means for providing shielding gas in an enclosure.

15. A welding device comprising:

a housing enclosing a power source constructed to supply a welding power;

a gas cylinder attached to the housing and constructed to provide a shielding gas, wherein the gas cylinder has a length that is less than a length of a side of the housing and the gas cylinder is fluidly connected to the welding device by translating the gas cylinder along a longitudinal axis of the gas cylinder;

a shroud positioned in the housing and having a recess constructed to receive the gas cylinder therein; and wherein the shroud further comprises a second recess connected to the first recess and constructed to snuggly receive an adapter body therein.

16. The welding device of claim 15 wherein the adapter body has a threaded recess constructed to engage the gas cylinder and a nipple disposed within the recess.

17. The welding device of claim 16 wherein the nipple operably engages a valve integral to the gas cylinder as the gas cylinder is moved relative to the adapter.

18. The welding device of claim 15 further comprising a third recess connected to the second recess opposite the first recess and constructed to snuggly receive a regulator therein.

* * * * *

UNITED STATES PATENT AND TRADEMARK OFFICE
CERTIFICATE OF CORRECTION

PATENT NO. : 7,411,147 B2
APPLICATION NO. : 10/709540
DATED : August 12, 2008
INVENTOR(S) : Stanzel et al.

It is certified that error appears in the above-identified patent and that said Letters Patent is hereby corrected as shown below:

Col. 4, line 22, delete "64" and substitute therefore -- 34 --.

Signed and Sealed this

Fourth Day of November, 2008

JON W. DUDAS
*Director of the United States Patent and Trademark Office*